US012613305B2

(12) United States Patent
Pandharipande et al.

(10) Patent No.: US 12,613,305 B2
(45) Date of Patent: Apr. 28, 2026

(54) INFRASTRUCTURE-ASSISTED SIGNALLING AND SENSING SYSTEMS

(71) Applicant: NXP B.V., Eindhoven (NL)

(72) Inventors: Ashish Pandharipande, Eindhoven (NL); Cornelis Marinus Moerman, Waalre (NL)

(73) Assignee: NXP B.V., Eindhoven (NL)

( * ) Notice: Subject to any disclaimer, the term of this patent is extended or adjusted under 35 U.S.C. 154(b) by 500 days.

(21) Appl. No.: 18/148,498

(22) Filed: Dec. 30, 2022

(65) Prior Publication Data

US 2024/0219512 A1    Jul. 4, 2024

(51) Int. Cl.
*G01S 7/00* (2006.01)
*G01S 13/58* (2006.01)

(52) U.S. Cl.
CPC ............ *G01S 7/003* (2013.01); *G01S 13/584* (2013.01)

(58) Field of Classification Search
CPC ...... G01S 13/931; G01S 13/584; G01S 7/003; G01S 2013/9316; H04W 4/46; H04W 4/40
USPC .................................................. 342/107, 58
See application file for complete search history.

(56) References Cited

U.S. PATENT DOCUMENTS

| | | | | | |
|---|---|---|---|---|---|
| 4,016,564 A | * | 4/1977 | Ross | ..................... | G01S 13/765 |
| | | | | | 342/30 |
| 4,040,054 A | * | 8/1977 | Overman | .............. | G01S 13/723 |
| | | | | | 342/13 |
| 4,454,510 A | * | 6/1984 | Crow | ..................... | G01S 13/79 |
| | | | | | 342/455 |
| 5,841,367 A | * | 11/1998 | Giovanni | .............. | G08G 1/162 |
| | | | | | 340/904 |

(Continued)

FOREIGN PATENT DOCUMENTS

| | | |
|---|---|---|
| WO | 2019050639 A1 | 3/2019 |
| WO | 2022/081624 A1 | 4/2022 |

OTHER PUBLICATIONS

U.S. Appl. No. 18/148,486, "Joint Communication and Sensing System and Signalling for User Equipment Sensing," filed Dec. 30, 2022, 37 pages.

(Continued)

*Primary Examiner* — Michael W Justice

(57) ABSTRACT

A radar system includes a transmitter, a receiver, a processor, and a non-transitory computer-readable medium storing machine instructions. The machine instructions cause the processor to obtain an indication of an approaching object, perform radar sensing of a region of interest to obtain environmental information, and transmit the environmental information for the region of interest to a communication system of the approaching object. In some implementations, the processor obtains the indication of the approaching object by receiving, from the communication system of the (Continued)

approaching object, a request for the environmental information for the region of interest. In some implementations, the processor obtains the indication of the approaching object by determining a location of the approaching object relative to the region of interest, and the radar system transmits the environmental information in response to the location of the approaching object being within a threshold distance of the region of interest.

18 Claims, 8 Drawing Sheets

(56) References Cited

U.S. PATENT DOCUMENTS

| | | | | |
|---|---|---|---|---|
| 6,236,933 B1* | 5/2001 | Lang | G08G 1/0104 | 701/119 |
| 6,798,374 B1* | 9/2004 | Smith | G01S 13/92 | 342/194 |
| 7,032,858 B2* | 4/2006 | Williams | G06V 10/255 | 342/25 R |
| 8,965,677 B2* | 2/2015 | Breed | G08G 1/163 | 701/301 |
| 9,126,694 B2* | 9/2015 | Chandrashekarappa | G08G 5/21 | |
| 9,299,253 B2* | 3/2016 | Eichhorst | G08G 1/087 | |
| 9,423,794 B2* | 8/2016 | Lind | G05D 1/0293 | |
| 9,533,617 B2* | 1/2017 | Van Steenkist | B60Q 9/008 | |
| 9,975,480 B2* | 5/2018 | Lai | G08G 1/167 | |
| 10,082,561 B2* | 9/2018 | Wilson-Langman | G01S 13/878 | |
| 10,379,210 B2* | 8/2019 | Jansen | G01S 13/345 | |
| 10,854,011 B2* | 12/2020 | Tay | G05D 1/0246 | |
| 11,099,267 B2* | 8/2021 | Wu | G01S 7/354 | |
| 11,127,150 B2* | 9/2021 | Uyeno | H01S 3/0071 | |
| 11,164,471 B1* | 11/2021 | Rupnik | G08G 5/80 | |
| 11,468,646 B1* | 10/2022 | Tay | G05D 1/0044 | |
| 11,638,258 B2* | 4/2023 | Bayesteh | H04W 4/70 | 370/336 |
| 11,694,452 B1* | 7/2023 | McCulley | G05B 19/05 | 356/4.01 |
| 11,893,682 B1* | 2/2024 | Tay | G05D 1/0088 | |
| 12,143,944 B2* | 11/2024 | Kumari | H04W 52/34 | |
| 12,249,240 B2* | 3/2025 | Kurehashi | G06V 20/58 | |
| 12,254,770 B2* | 3/2025 | Ansari | G08G 1/096725 | |
| 2006/0049974 A1* | 3/2006 | Williams | G06V 10/255 | 342/52 |
| 2006/0262007 A1* | 11/2006 | Bonthron | G01S 13/44 | 342/107 |
| 2012/0299713 A1* | 11/2012 | Elia | G01S 19/17 | 340/435 |
| 2012/0310599 A1* | 12/2012 | Tanaka | A01B 79/005 | 702/189 |
| 2012/0323474 A1* | 12/2012 | Breed | G08G 1/161 | 701/117 |
| 2013/0015999 A1* | 1/2013 | Alland | G01S 13/931 | 342/70 |
| 2013/0211624 A1* | 8/2013 | Lind | G05D 1/0293 | 701/2 |
| 2014/0009275 A1* | 1/2014 | Bowers | G06Q 20/145 | 340/436 |
| 2014/0142800 A1* | 5/2014 | Zeng | G06F 11/3055 | 701/30.6 |
| 2015/0019047 A1* | 1/2015 | Chandrashekarappa | B64D 43/00 | 701/3 |
| 2015/0371538 A1* | 12/2015 | Eichhorst | G08G 1/087 | 340/906 |
| 2015/0378004 A1* | 12/2015 | Wilson-Langman | G01S 7/003 | 342/52 |
| 2016/0306357 A1* | 10/2016 | Wieskamp | B60W 30/12 | |
| 2016/0318446 A1* | 11/2016 | Van Steenkist | G08G 5/80 | |
| 2017/0023670 A1* | 1/2017 | Jansen | G01S 13/343 | |
| 2018/0220279 A1* | 8/2018 | Jung | H04L 12/2823 | |
| 2019/0311546 A1* | 10/2019 | Tay | G06T 7/521 | |
| 2020/0013181 A1* | 1/2020 | Uyeno | H04N 23/61 | |
| 2020/0084278 A1* | 3/2020 | Cheng | H04L 67/12 | |
| 2020/0191940 A1* | 6/2020 | Wu | G01S 13/931 | |
| 2021/0076367 A1* | 3/2021 | Bayesteh | H04W 4/70 | |
| 2022/0065982 A1* | 3/2022 | Jernbäcker | G08G 5/26 | |
| 2022/0256519 A1* | 8/2022 | Jeon | G01S 7/0235 | |
| 2022/0350009 A1* | 11/2022 | Sahin | G01S 7/006 | |
| 2022/0406190 A1* | 12/2022 | Kurehashi | G08G 1/164 | |
| 2023/0074360 A1* | 3/2023 | Kumari | G01S 7/0236 | |
| 2023/0267834 A1* | 8/2023 | Ansari | H04L 9/30 | 701/2 |

OTHER PUBLICATIONS

Abdel-Aziz, et al., "Vehicular Cooperative Perception Through Action Branching and Federated Reinforcement Learning," in IEEE Transactions on Communications, vol. 70, No. 2, pp. 891-903, Feb. 2022.

ETSI, "ETSI TR 103 562 V2.1.1 (Dec. 2019), Technical Report, Intelligent Transport Systems (ITS); Vehicular Communications; Basic Set of Applications; Analysis of the Collective Perception Service (CPS); Release 2" downloaded from https://www.etsi.org/deliver/etsi_tr/103500_103599/103562/02.01.01_60/tr_103562v020101p.pdf Dec. 29, 2022, 119 pages.

* cited by examiner

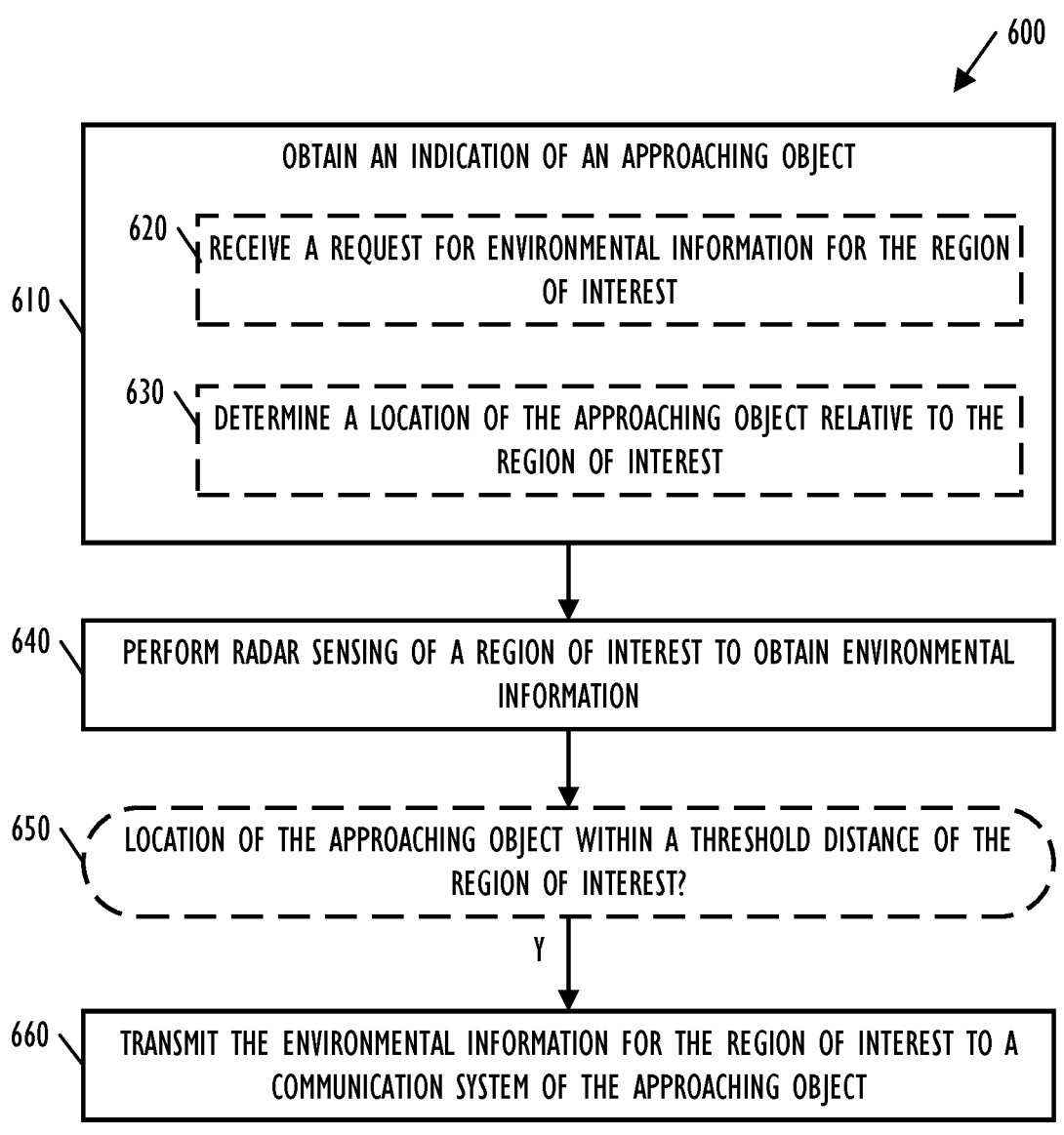

600

OBTAIN AN INDICATION OF AN APPROACHING OBJECT

620 ⟍ RECEIVE A REQUEST FOR ENVIRONMENTAL INFORMATION FOR THE REGION OF INTEREST

610 ⟍

630 ⟍ DETERMINE A LOCATION OF THE APPROACHING OBJECT RELATIVE TO THE REGION OF INTEREST

640 ⟍ PERFORM RADAR SENSING OF A REGION OF INTEREST TO OBTAIN ENVIRONMENTAL INFORMATION

650 ⟍ LOCATION OF THE APPROACHING OBJECT WITHIN A THRESHOLD DISTANCE OF THE REGION OF INTEREST?

Y

660 ⟍ TRANSMIT THE ENVIRONMENTAL INFORMATION FOR THE REGION OF INTEREST TO A COMMUNICATION SYSTEM OF THE APPROACHING OBJECT

FIG. 6

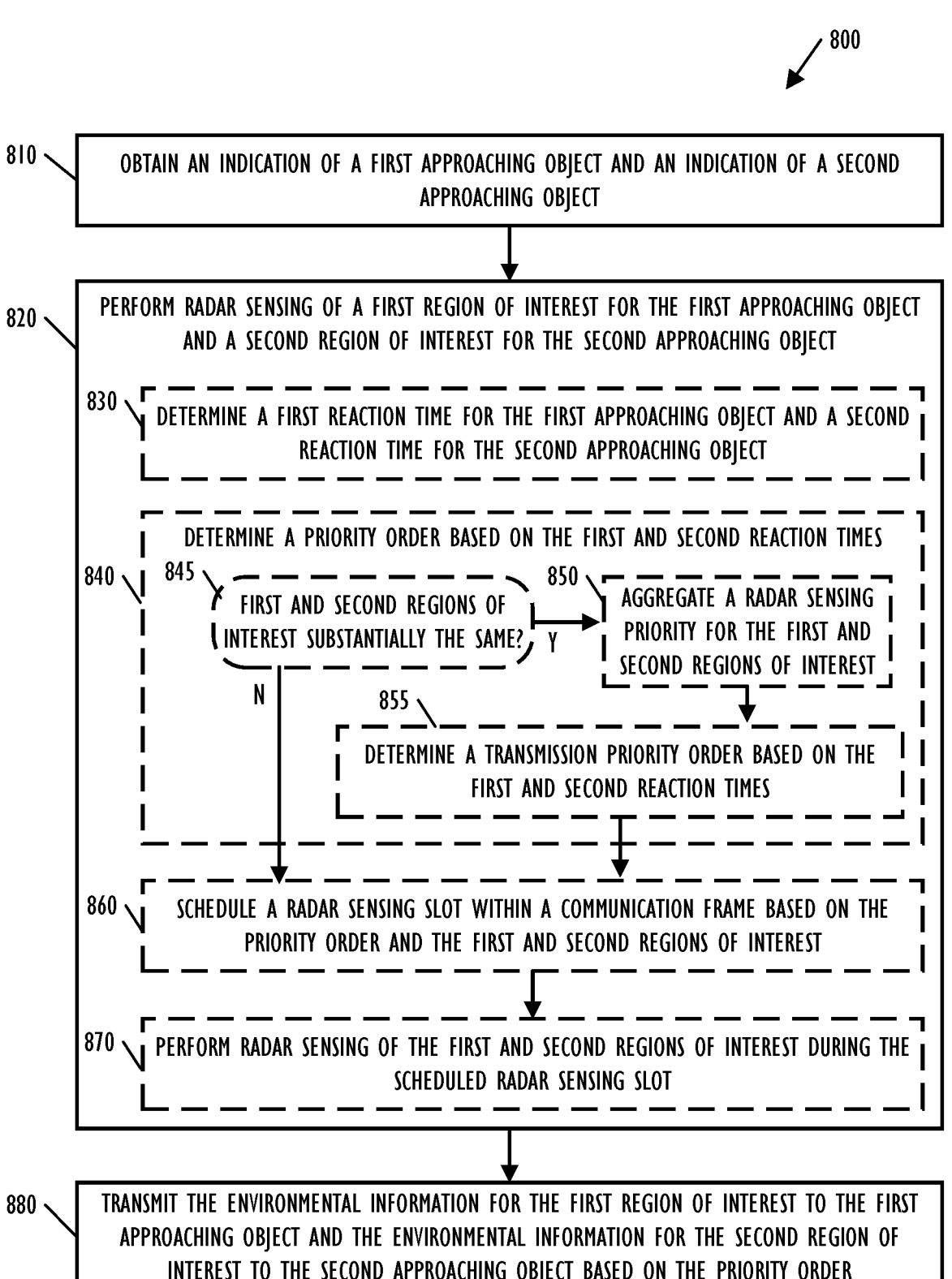

810 — OBTAIN AN INDICATION OF A FIRST APPROACHING OBJECT AND AN INDICATION OF A SECOND APPROACHING OBJECT

820 — PERFORM RADAR SENSING OF A FIRST REGION OF INTEREST FOR THE FIRST APPROACHING OBJECT AND A SECOND REGION OF INTEREST FOR THE SECOND APPROACHING OBJECT

830 — DETERMINE A FIRST REACTION TIME FOR THE FIRST APPROACHING OBJECT AND A SECOND REACTION TIME FOR THE SECOND APPROACHING OBJECT

840 — DETERMINE A PRIORITY ORDER BASED ON THE FIRST AND SECOND REACTION TIMES

845 — FIRST AND SECOND REGIONS OF INTEREST SUBSTANTIALLY THE SAME?

850 — Y — AGGREGATE A RADAR SENSING PRIORITY FOR THE FIRST AND SECOND REGIONS OF INTEREST

N

855 — DETERMINE A TRANSMISSION PRIORITY ORDER BASED ON THE FIRST AND SECOND REACTION TIMES

860 — SCHEDULE A RADAR SENSING SLOT WITHIN A COMMUNICATION FRAME BASED ON THE PRIORITY ORDER AND THE FIRST AND SECOND REGIONS OF INTEREST

870 — PERFORM RADAR SENSING OF THE FIRST AND SECOND REGIONS OF INTEREST DURING THE SCHEDULED RADAR SENSING SLOT

880 — TRANSMIT THE ENVIRONMENTAL INFORMATION FOR THE FIRST REGION OF INTEREST TO THE FIRST APPROACHING OBJECT AND THE ENVIRONMENTAL INFORMATION FOR THE SECOND REGION OF INTEREST TO THE SECOND APPROACHING OBJECT BASED ON THE PRIORITY ORDER

INFRASTRUCTURE-ASSISTED SIGNALLING AND SENSING SYSTEMS

BACKGROUND

Joint communication and sensing systems share a single hardware platform and balance available resources spent on communication signals and signal processing and radar signals and signal processing. Base stations may perform radar sensing to obtain information about the surrounding environment and communicate the information about the environment to nearby user devices.

BRIEF DESCRIPTION OF THE DRAWINGS

The present invention may be better understood, and its numerous objects, features, and advantages made apparent to those skilled in the art by referencing the accompanying drawings.

FIG. 6 shows, in flow chart form, an example process for infrastructure-assisted sensing and signaling, according to one embodiment.

FIG. 8 shows, in flow chart form, a further example process for infrastructure-assisted sensing and signaling, according to one embodiment.

The use of the same reference symbols in different drawings indicates identical items unless otherwise noted. The Figures are not necessarily drawn to scale.

DETAILED DESCRIPTION

As discussed previously herein, base stations can perform radar sensing to obtain information about the surrounding environment. The techniques and methods described herein enable base stations to operate in a reactive or proactive mode of operation to provide relevant environmental information to nearby objects in a timely manner. In a reactive sensing mode of operation, the base station obtains an indication of an approaching object, such as by receiving an information request from the approaching object. The information request can include a region of interest for the approaching object, a reaction time for the approaching object, and the like. The base station performs radar sensing of the region of interest to obtain environmental information and transmits the environment information to a communication system of the approaching object, for example within the reaction time for the approaching object.

In a proactive sensing mode of operation, the base station performs radar sensing of a known region of interest at intervals over time, such as once every minute or during low bandwidth requirements on the communication resources of the base station. The base station obtains an indication of an approaching object, such as by determining a location of the approaching object relative to the region of interest, and transmits the most current environmental information to a communication system of the approaching object.

Figure 1:
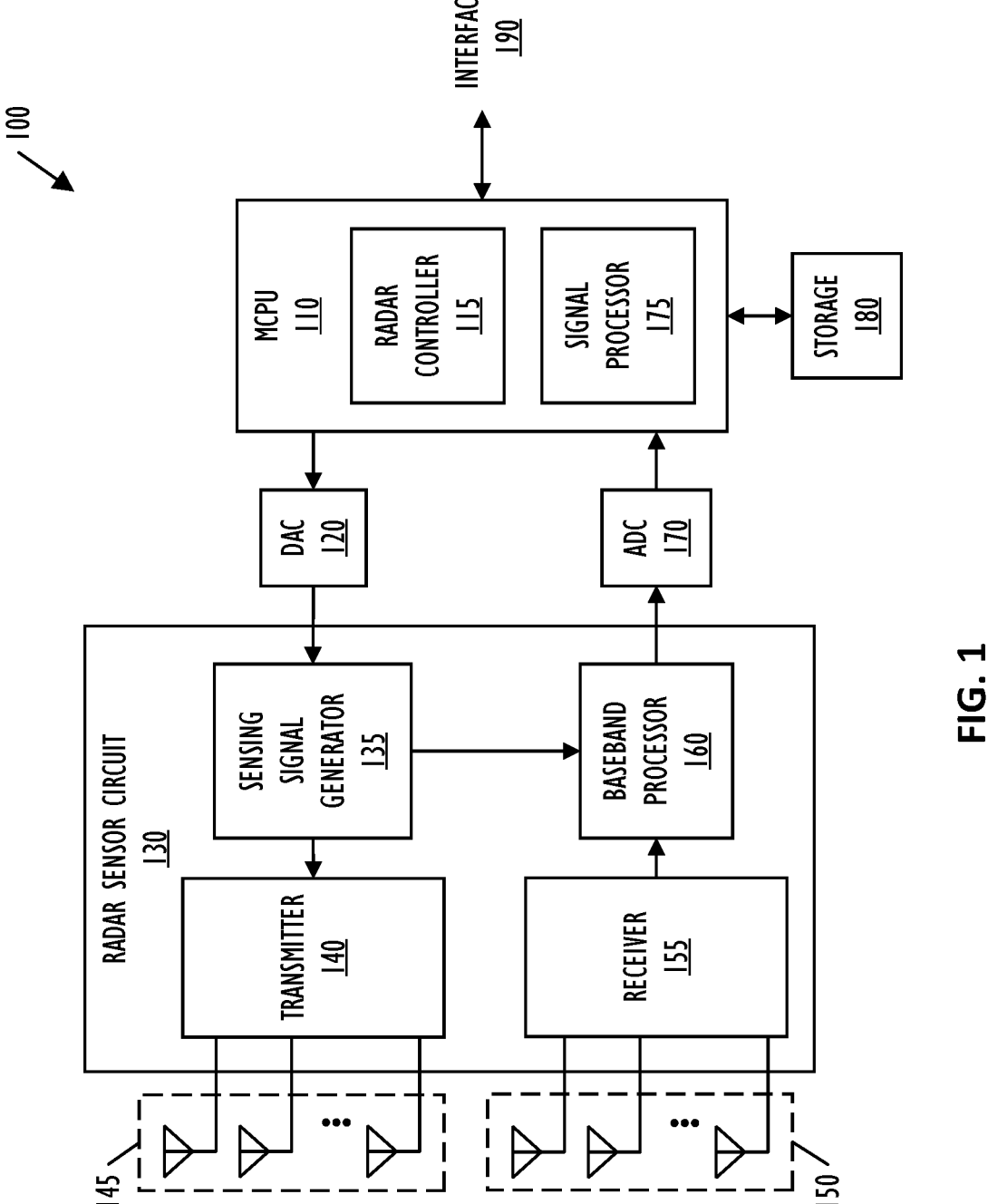
FIG. 1 shows, in block diagram form, an example radar transceiver system, according to one embodiment.

FIG. 1 shows, in block diagram form, an example radar transceiver system 100, according to an embodiment. Radar system 100 can be included in a user device, for example a vehicle's driver assistance system, or in a communication base station. The example radar system 100 is a frequency-modulated continuous wave (FMCW) radar system, also referred to as a continuous-wave frequency-modulated (CWFM) radar, and capable of determining the distance or range, velocity, and angle of arrival of an object in the field of view of radar system 100. Although radar system 100 is described herein as a linear chirp radar system, any appropriate radar system that generates at least one of range, Doppler, and angle of arrival information can be used, such as orthogonal frequency-domain multiplexing, polyphase sequencing, binary sequencing, Zadoff-Chu sequencing, and the like.

In this example, radar system 100 includes a microcontroller and processor unit (MCPU) 110, a digital-to-analog converter (DAC) 120, a radar sensor circuit 130, a first antenna array 145, a second antenna array 150, an analog-to-digital converter (ADC) 170, and storage 180. The radar sensor circuit 130 is a radar transceiver circuit in this example, and includes both transmitter and receiver signal chains. The MCPU 110 comprises one or more MCPU cores, general purpose processing cores, field-programmable gate arrays, digital signal processors, application-specific integrated circuits, and the like, or any combination thereof. The term "MCPU" in the singular is used herein to refer to either a single or multiple of the MCPU cores, general purpose processing cores, field-programmable gate arrays, digital signal processors, application-specific integrated circuits, and the like, or any combination thereof comprised in the MCPU 110.

MCPU 110 includes a radar controller 115 and a signal processor 175. The radar controller 115 can receive data from the radar sensor circuit 130 and control radar parameters of the radar sensor circuit 130 such as frequency band, length of a radar frame, and the like via the DAC 120. A control signal from DAC 120 can be used to adjust the radar sensing signals output from a sensing signal generator 135 included in the radar sensor circuit 130. The signal processor 175 in MCPU 110 can also receive the data from the radar sensor circuit 130 and perform signal processing for determining a distance or range between a target object and radar system 100, a velocity of the target object, an angle of arrival for the target object, and the like. The signal processor 175 can provide the calculated values to the storage 180 and/or to other systems via the interface 190.

The interface 190 can enable the MCPU 110 to communicate with other systems over local and wide area networks, the internet, automotive communication buses, and/or other kinds of wired or wireless communication systems, for example. The MCPU 110 can provide the calculated values over the interface 190 to other systems and devices. For example, the radar system 100 is included in a communication base station and provides the calculated values of distance, velocity, and angle of arrival to user devices, such as vehicles in the proximity of the communication base station. As another example, the radar system 100 is included in a vehicle's driver assistance system and provides the calculated values of distance, velocity, and angle of arrival to the driver assistance systems of other nearby vehicles. The storage 180 can be used to store instructions for the MCPU 110, received data from the radar sensor circuit 130, calculated values from the signal processor 175, and the like. Storage 180 can be any appropriate storage medium, such as a volatile or non-volatile memory.

The radar sensor circuit 130 includes the sensing signal generator 135, a transmitter 140, a receiver 155, and a baseband processor 160. The sensing signal generator 135 can include a local oscillator, for example, and generates radar sensing signals and provides them to the transmitter 140. For example, the sensing signal generator 135 can frequency modulate a continuous wave signal to form a series of linear chirp signals. The transmitted chirp signal of a known, stable frequency continuous wave varies up and down in frequency over a fixed period of time by the modulated signal. The sensing signal generator 135 provides the generated chirp signals to the transmitter 140, which drives the first antenna array 145 of one or more transmitter (TX) antennas. The second antenna array 150 comprises one or more receiver (RX) antennas and receives signals reflected from objects in the path of the transmitted chirp signals from the TX antenna array 145. The TX antenna array 145 and the RX antenna array 150 can be stationary or configured to transmit and receive across a range of area, such as by mechanical movement.

The receiver 155 receives the reflected signals from the RX antenna array 150 and provides them to the baseband processor 160. The baseband processor 160 also receives the transmitted sensing signals from the sensing signal generator 135 and down-converts the received sensing signals directly into the baseband using the copy of the transmitted sensing signals from the sensing signal generator 135. The baseband processor 160 can then filter and amplify the baseband signal. The baseband processor 160 provides the filtered and amplified baseband signal to the ADC 170, which digitizes the signal and provides it to the MCPU 110. The signal processor 175 in the MCPU 110 can then perform time domain to frequency domain transforms such as fast Fourier transforms (FFTs) and other signal processing to determine the distance, velocity, and angle of arrival between the target object and the radar system 100.

Frequency differences between the received reflections and the transmitted sensing signal increase with delay and so are proportional to distance. The phase differences between the received reflections across consecutive chirps in a radar frame are indicative of the velocity of objects in the field of view. For implementations in which RX antenna array 150 includes two or more receiver antennas, the phase difference between received reflections at a first RX antenna and received reflections at a second RX antenna can be used to determine the angle of arrival of target objects. For example, the down-converted and digitized receive signal corresponding to each chirp is first transformed using an FFT (called the range FFT). The range FFT produces a series of range bins with the value of each range bin denoting the signal strength of reflected targets at the corresponding range. A Doppler FFT is then performed for each range bin across all the chirps in a frame to estimate the velocities of reflected targets. Additional processing can then be performed to determine the angle of arrival between the targets and the radar system 100.

For an implementation in which the radar transceiver system 100 is included in a joint communication and sensing base station, the base station can use the determined distance, velocity, and angle of arrival for objects in the field of view from the radar system 100 to provide information about objects in the environment to other devices in the proximity of the communication base station. For example, the communication base station can provide environmental information to vehicles moving through the field of view of the radar system 100. The communication base station can incorporate radar sensing slots into the communication frame between the communication base station and a nearby vehicle, such that the base station is able to provide meaningful environmental information without disrupting normal communications between the base station and the nearby vehicle.

Figure 2:
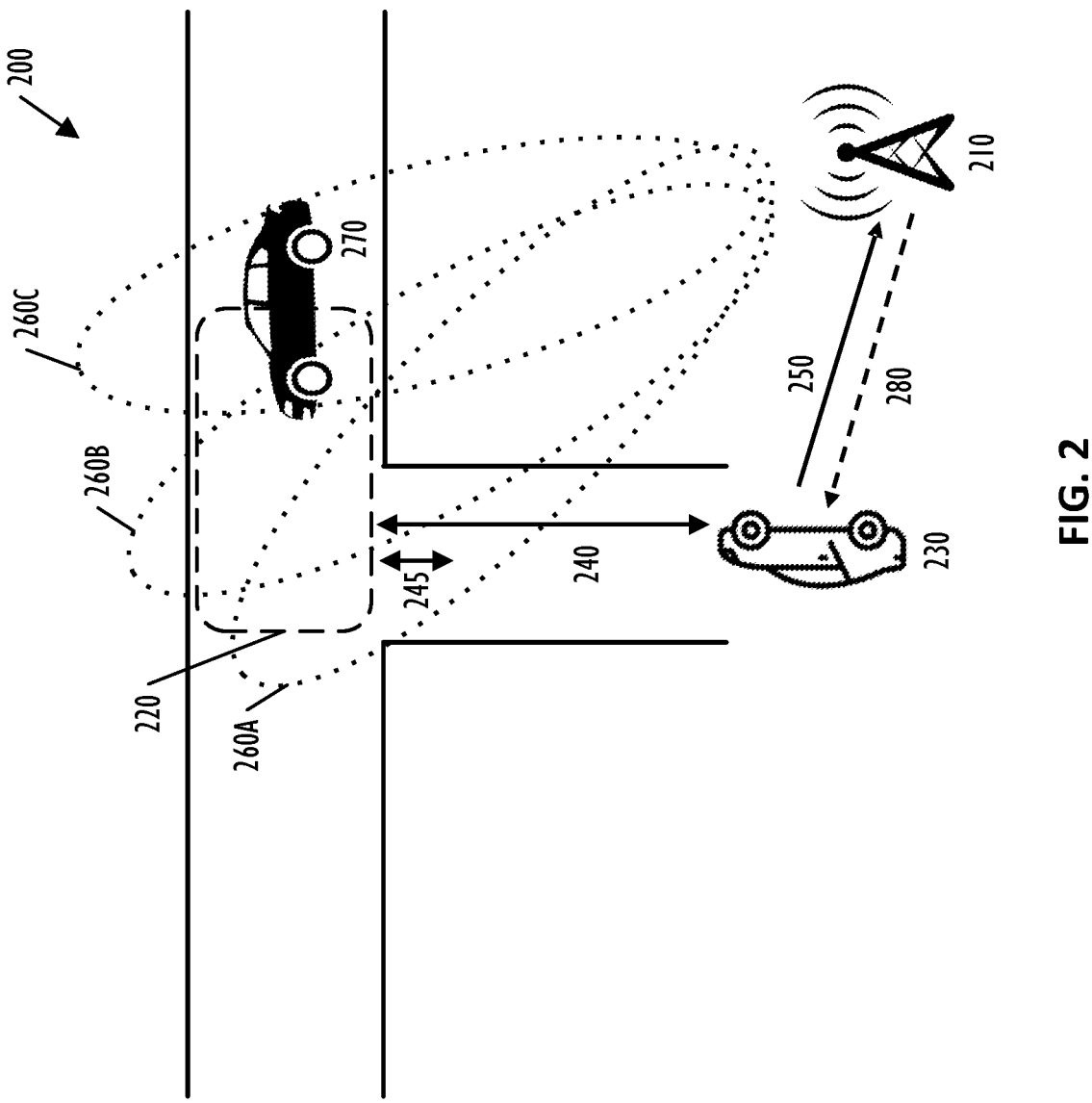
FIG. 2 shows a diagram of an example base station operating in a reactive sensing mode of operation in an example environment, according to one embodiment.

FIG. 2 shows a diagram 200 of an example base station 210 operating in a reactive sensing mode of operation in an example environment, according to one embodiment. In this example, the base station 210 includes the radar transceiver system 100 shown in FIG. 1, and an approaching object 230 is a vehicle that includes a communication system. The approaching object 230 transmits an information request signal 250 to the base station 210 as it approaches along the road. The information request signal 250 can include an indicator of a region of interest to the approaching object 230, such as the intersection included in the region of interest 220, a reaction time for the approaching object 230, or both. The reaction time for the approaching object 230 can indicate an amount of time before the approaching object 230 reaches the region of interest 220 and thus, an amount of time in which the base station 210 can perform radar sensing of the region of interest 220 and provide the environmental information about the region of interest 220 to the approaching object 230.

For example, the approaching object 230 transmits the information request signal 250 in response to being a first distance 240 away from the region of interest 220. The approaching object 230 is moving at a particular speed and must receive the environmental information from the base station 210 before the approaching object 230 is a second distance 245 away from the region of interest. The reaction time can indicate the amount of time for the approaching object 230 to travel from the first distance 240 to the second distance 245 and thus, the amount of time for the base station 210 to provide environmental information about the region of interest 220 to the approaching object 230. The first distance 240 and the second distance 245 can be chosen based on the environment and the speed at which the approaching object 230 moves. The first distance 240 and the second distance 245 are given by way of example to illustrate possible triggers for sending the information request signal 250 and determining the reaction time; any appropriate technique to determine an appropriate time at which to send the information request signal 250 and/or to determine a reaction time for the approaching object 230 can be used.

In response to receiving the information request signal 250, the base station 210 can perform radar sensing of the region of interest 220 to obtain environmental information, such as objects detected in the region of interest 220 and corresponding velocities and angles of arrival for the detected objects. That is, in a reactive sensing mode of operation, the base station 210 performs radar sensing in response to receiving an information request signal 250. In this example, the region of interest 220 includes a portion of a vehicle 270, and the environmental information can include location information for the vehicle 270, a velocity of the vehicle 270, and an angle of arrival for the vehicle 270. The base station 210 can then transmit an information signal 280 with the environmental information to the approaching object 230.

The base station 210 can perform radar sensing in stages based on the field of view of the radar transceiver system 100 included in the base station 120 and the size of the region of interest 220. That is, the base station 210 can perform a first radar sensing operation over a region indicated by 260A, a second radar sensing operation over a region indicated by 260B, and a third radar sensing operation over a region indicated by 260C and aggregate the radar data to obtain environmental information for the region of interest 220.

In addition, the base station 210 can schedule the radar sensing operations into radar sensing time slots within communication frames for the base station 210 based on the reaction time included in the information request 250 and the region of interest 220. For example, the base station 210 can schedule at least one sensing time slot within a communication frame such that the radar sensing operations and resulting radar calculations are completed in time to transmit the environmental information to the approaching object 230 within the time limits indicated by the reaction time. As another example, vehicles traveling through the region of interest 220 are expected to be traveling at a particular speed, such as a speed indicated by a speed limit. The base station 210 can schedule an appropriate number of sensing time slots at appropriate intervals within the communication frame such that the velocity of fast-moving vehicles traveling through the region of interest 220 can be determined. Scheduling the radar sensing time slots within a communication frame is described further herein with respect to FIG. 5.

Figure 3:
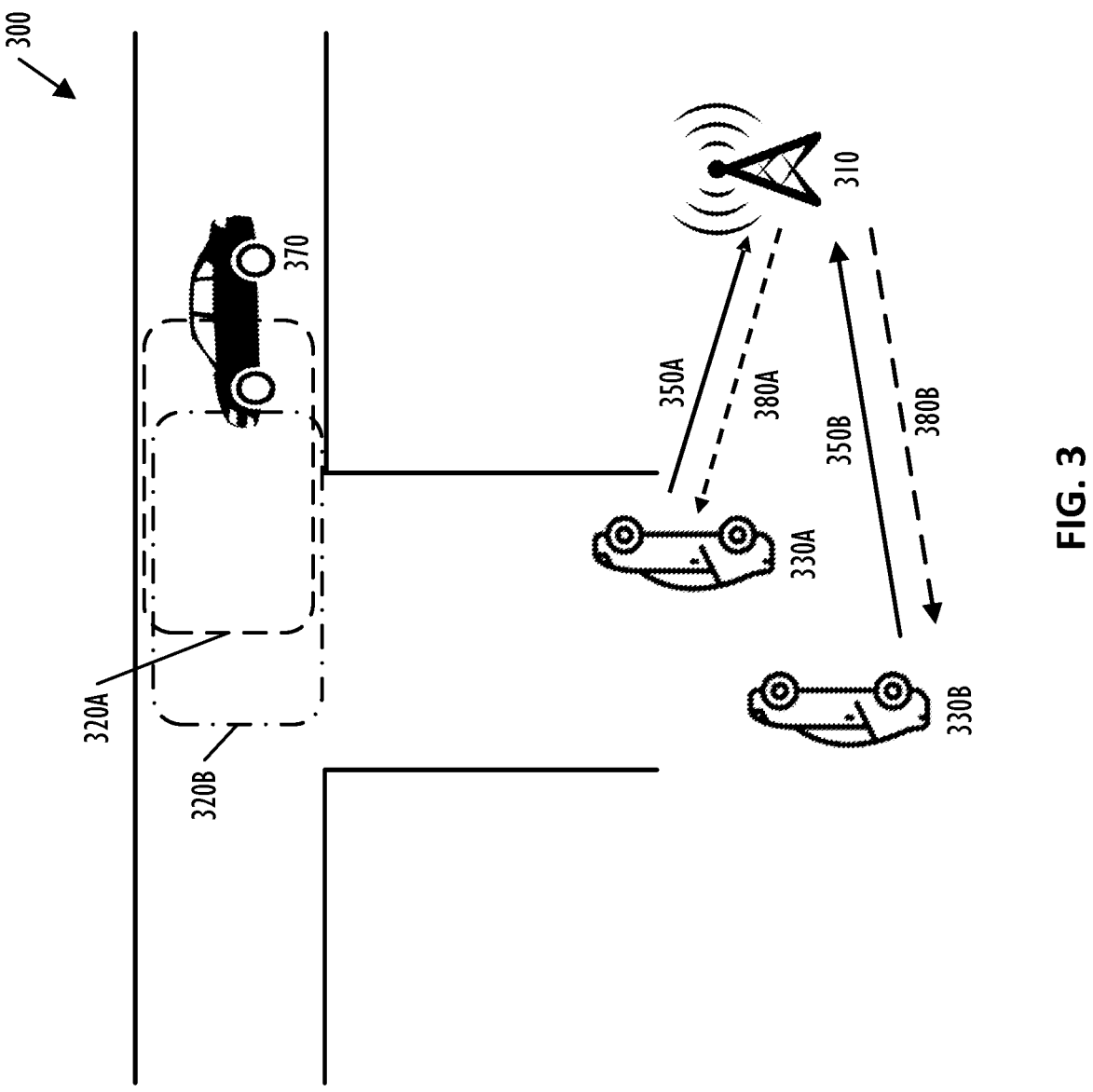
FIG. 3 shows a diagram of an example base station operating in a reactive sensing mode of operation in an example environment with two approaching objects, according to one embodiment.

FIG. 3 shows a diagram 300 of an example base station 310 operating in a reactive sensing mode of operation in an example environment with two approaching objects, according to one embodiment. The diagram 300 is similar to the diagram 200 shown in FIG. 2, but includes two approaching objects 330A-B. For ease of illustration, the radar sensing regions indicated as 260A-C in diagram 200 are omitted from diagram 300. The base station 310 includes the radar transceiver system 100 shown in FIG. 1, and the approaching object 330A-B are vehicles that include communication systems. The approaching objects 330A-B transmit information request signals 350A-B, respectively, to the base station 310 as they approach along the road. The information request signal 350A can include an indicator of the region of interest 320A and a reaction time for the approaching object 330A, and the information request signal 350B can include an indicator of the region of interest 320B and a reaction time for the approaching object 330B.

In response to receiving the information request signals 350A-B, the base station 310 can determine a priority order based on the reaction times for the approaching objects 330A-B. For example, the second approaching object 330B can be moving faster than the first approaching object 330A and have a shorter reaction time, such that the base station 310 prioritizes radar sensing of the region of interest 320B for the second approaching object 330B over radar sensing of the region of interest 320A for the first approaching object 330A and prioritizes transmission of the information signal 380B to the second approaching object 330B over transmission of the information signal 380A to the first approaching object 330A. The base station 310 can then schedule radar sensing slots within a communication frame based on the priority order.

In some implementations, the base station 310 can determine whether the regions of interest 320A-B are overlapping or substantially the same, and if so, aggregate a radar sensing priority for the regions of interest 320A-B and determine a transmission priority order for the information signals 380A-B based on the reaction times for the approaching objects 330A-B. Returning to the example in which the second approaching object 330B moves faster than the first approaching object 330A and has a shorter reaction time, the base station 310 can determine the regions of interest 320A-B are substantially the same and aggregate the radar sensing priority for the regions of interest 320A-B. The base station can then prioritize transmission of the information signal 380B to the second approaching object 330B over transmission of the information signal 380A to the first approaching object 330A. The threshold amount of overlap between the regions of interest 320A-B can be determined based on the sizes of the regions of interest 320A-B, the radar sensing regions of base station 310, the field of view of the radar sensing system in base station 310, and the like.

Figure 4:
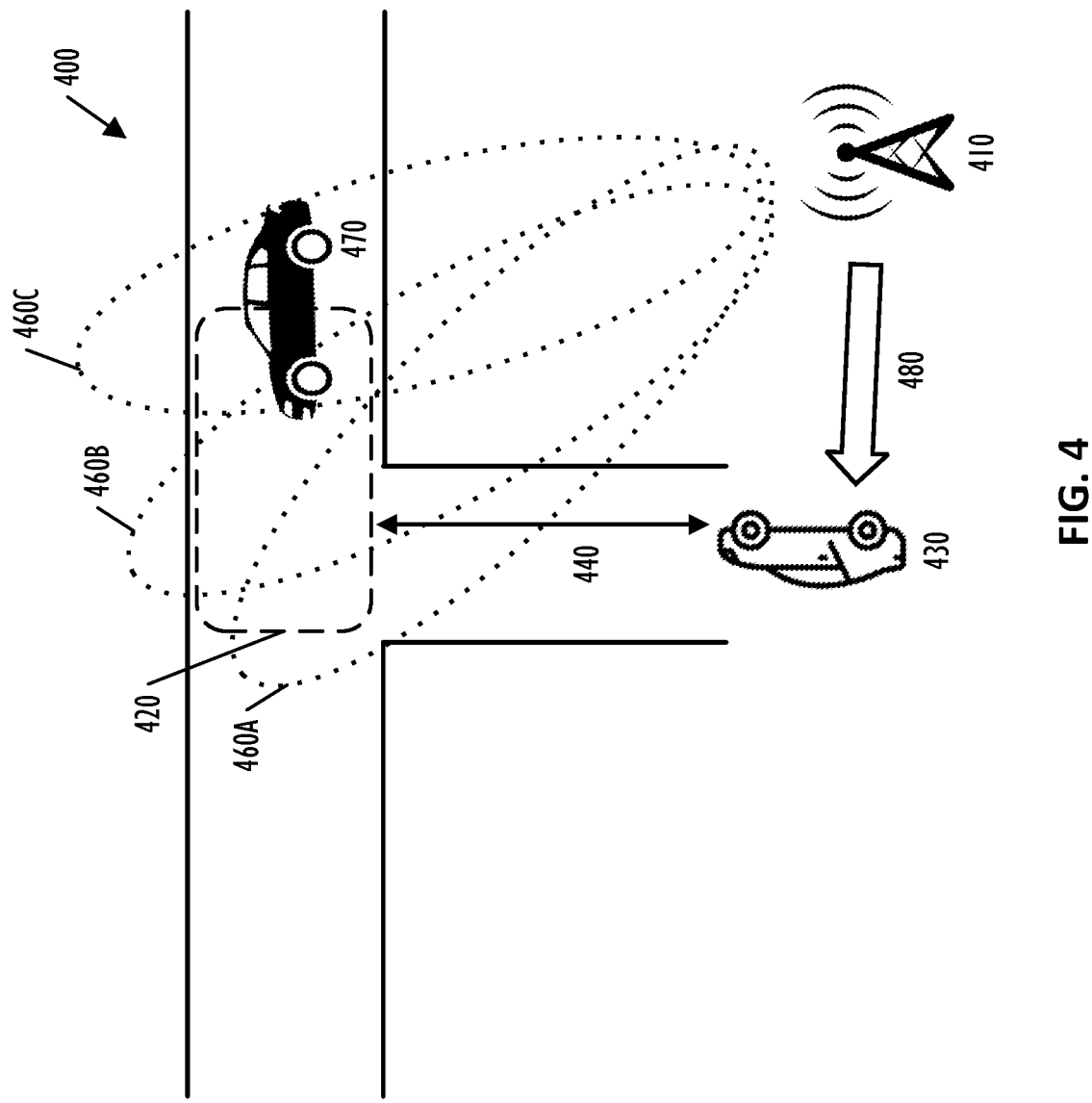
FIG. 4 shows a diagram of an example base station operating in a proactive sensing mode of operation in an example environment, according to one embodiment.

FIG. 4 shows a diagram 400 of an example base station 410 operating in a proactive sensing mode of operation in an example environment, according to one embodiment. In this example, the base station 410 includes the radar transceiver system 100 shown in FIG. 1, and an approaching object 430 is a vehicle that includes a communication system. In the proactive sensing mode of operation, the regions of interest in the environment may be predetermined, and the base station 410 performs radar sensing of the region of interest 420 at intervals over time. The base station 410 can determine the location of the approaching object 430 relative to the region of interest 420 and transmit an information signal 480 including the most recent environmental information for the region of interest 420 to the approaching object 430 in response to the location of the approaching object 430 being within a particular threshold distance 440 from the region of interest 420. The threshold distance 440 can be chosen based on characteristics of the region of interest 420 and the approaching object 430, such as the expected speed of objects in the region of interest 420 and the expected speed and corresponding reaction time of the approaching object 430.

In the proactive sensing mode of operation, the base station 410 performs radar sensing at intervals over time. For example, the base station 410 can perform radar sensing at regular intervals over time, such as once every minute. As another example, the base station 410 can perform radar sensing during lulls in the communication demands of the base station 410. That is, the base station 410 can perform radar sensing in response to the communication bandwidth for the base station 410 being less than a threshold bandwidth. As a further example, the base station 410 can perform radar sensing during lulls in the communication demands but not less frequently than once every minute. That is, the base station 410 can perform radar sensing during lulls in the communication demands of base station 410, but ensures that radar sensing is performed at least once every minute regardless of the communication demands of base station 410. The base station 410 can further refine the scheduling of radar sensing based on characteristics of objects in the region of interest 420 such as expected speed and the like. Scheduling the radar sensing time slots within a communication frame is described further herein with respect to FIG. 5.

Figure 5:
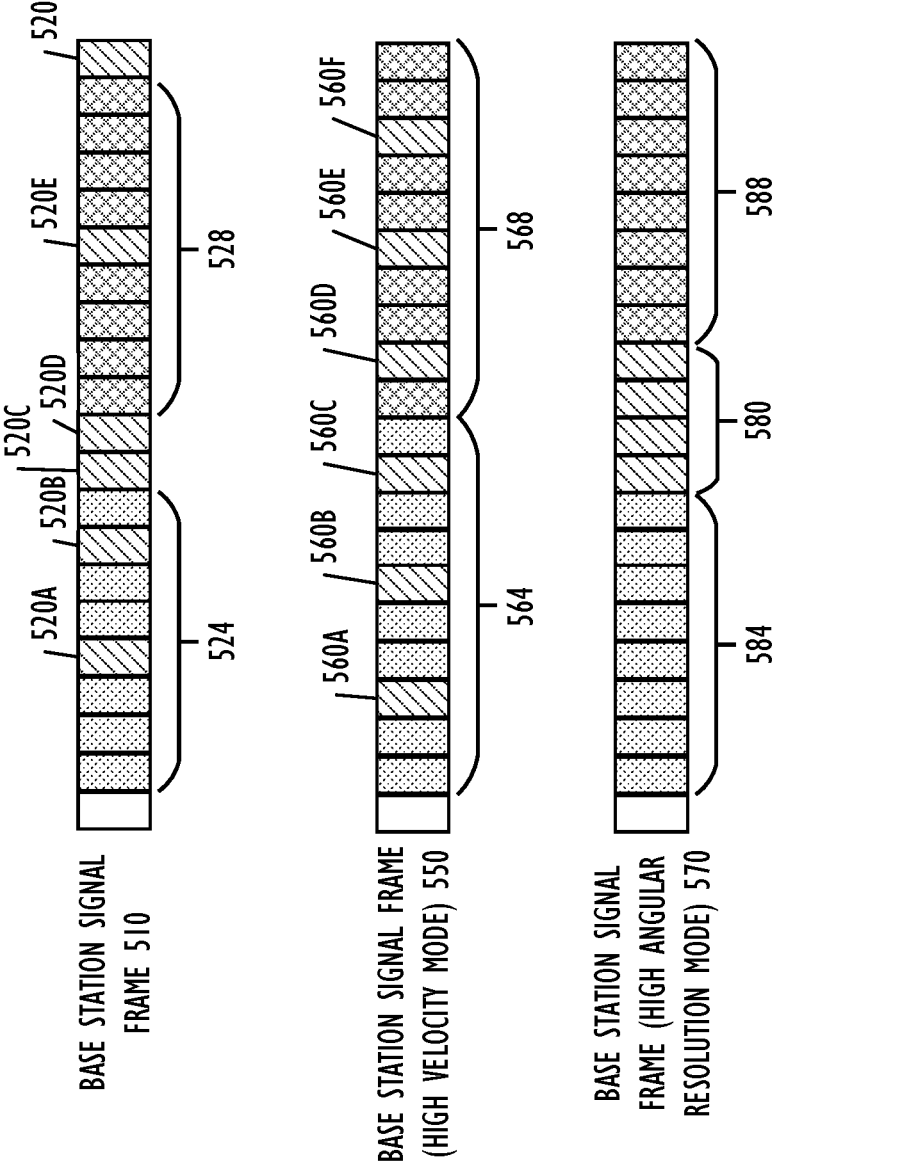
FIG. 5 shows diagrams of signal frames for the example base station shown in FIG. 2 and an approaching object, according to some embodiments.

FIG. 5 shows diagrams of signal frames for the base station 210 shown in FIG. 2, according to some embodiments. For ease of illustration, FIG. 5 is described herein with reference to the diagram 200 shown in FIG. 2, but the signal frames shown in FIG. 5 are also applicable to the diagram 300 shown in FIG. 3 and the diagram 400 shown in FIG. 4. The diagram 500 includes base station signal frames 510, 550, and 570. The base station signal frame 510 includes a set 520 of radar sensing slots, a set 524 of downlink communication slots, and a set 528 of uplink communication slots. The set 520 of radar sensing slots are interspersed among slots in the set 524 of downlink communication slots and the set 528 of uplink communication slots.

The base station signal frame 510 includes the set 524 of downlink communication slots during which the base station 210 transmits information to one or more communication systems of the approaching object 230 or other nearby objects. During the set 528 of uplink communication slots in the base station signal frame 510, the base station 210 receives information from one or more communication systems of the approaching object 230 or other nearby objects. The radar sensing slots 520 in the base station signal frame 510 are interspersed among the set 524 of the downlink communication slots and the set 528 of the uplink communication slots. The numbers of downlink communication slots in the set 524, uplink communication slots in the set 528, and radar sensing slots 520 in the base station signal frame 510 are by way of example only, and can vary based on the particular communication standard implemented. In addition, the location of the radar sensing slots 520 within the base station signal frame 510 can vary based on the desired accuracy and other characteristics of the radar sensing.

For example as shown in base station signal frame 550, the base station 210 can operate in a high velocity sensing mode to use radar sensing data to determine the velocity of fast moving objects 270 in the environment. In the high velocity sensing mode, the radar sensing slots 560 can be interspersed at regular intervals among the set 564 of downlink communication slots and the set 568 of uplink communication slots. The number of radar sensing slots 560 and the intervals at which the radar sensing slots 560 are interspersed with the set 564 of downlink communication slots and the set 568 of uplink communication slots can be chosen based on an expected speed of fast moving objects 270 in the environment. For example, the base station 210 can be positioned along a highway, and the posted speed limit of the highway can be used as the expected speed of fast moving objects 270 and to determine the appropriate number and interleaving of radar sensing slots 560 within the base station signal frame 550.

As another example shown in base station signal frame 570, the base station 210 can operate in a high angular resolution mode to use radar sensing data to determine the angle of arrival of objects 270 in the environment with a higher accuracy than in other operating modes. In the high angular resolution mode, the radar sensing slots 580 can be grouped together in a single block between the set 584 of downlink communication slots and the set 588 of uplink communication slots. The number of radar sensing slots 580 to be grouped together in the base station signal frame 570 can be chosen based on an expected range of angles of arrival of objects 270 in the environment. For example, the base station 210 can be positioned along a highway, and the oncoming lanes of the highway occupy a particular range of the field of view of the radar system included in the base station 210. The particular range of the field of view of the radar system can be used to determine the appropriate number of radar sensing slots 580 in the base station signal frame 570.

In addition, the base station can change the mode of operation, such that the communication signal frame format changes. For example, at a first time the base station 210 can operate in a normal mode of operation and use the base station signal frame 510 to perform radar sensing and communicate with the approaching object 230. At a second, later time, the base station 210 can change to either of the high velocity sensing mode and the high angular resolution mode and use the corresponding base station signal frame 550 or 570, respectively.

FIG. 6 shows, in flow chart form, an example process 600 for infrastructure-assisted sensing and signaling, according to one embodiment. For ease of illustration, the process 600 is described herein with reference to the diagrams 200 and 400 shown in FIGS. 2 and 4, respectively. The process 600 can be performed by any appropriate processing unit executing instructions stored in any appropriate non-transitory computer-readable medium. The steps of process 600 are shown in a particular order in FIG. 6, but the steps of process 600 may be performed in a different order and/or with some steps performed simultaneously. One or more steps of process 600 can be optional, and process 600 can include additional steps.

The process 600 begins at step 610, at which a base station obtains an indication of an approaching object. In a reactive sensing mode of operation as described herein with reference to FIG. 2, the base station can receive a request for environmental information for the region of interest from the approaching object at step 620. In a proactive sensing mode of operation as described herein with reference to FIG. 4, the base station can determine a location of the approaching object relative to the region of interest at step 630. The base station can then perform radar sensing of a region of interest to obtain environmental information at step 640.

In the proactive sensing mode of operation, the base station can determine whether the location of the approaching object is within a threshold distance of the region of interest at step 650. For example as described herein with respect to FIG. 4, the base station determines whether the approaching object 430 is within the threshold distance 440 of the region of interest 420. The threshold distance can be chosen based on characteristics of the region of interest and the approaching object, such as the expected speed of objects in the region of interest and the expected speed and corresponding reaction time of the approaching object. In response to determining the approaching object is within the threshold distance at step 650 or after performing the radar sensing at step 640, the base station can transmit the environmental information for the region of interest to a communication system of the approaching object at step 660.

Figure 7:
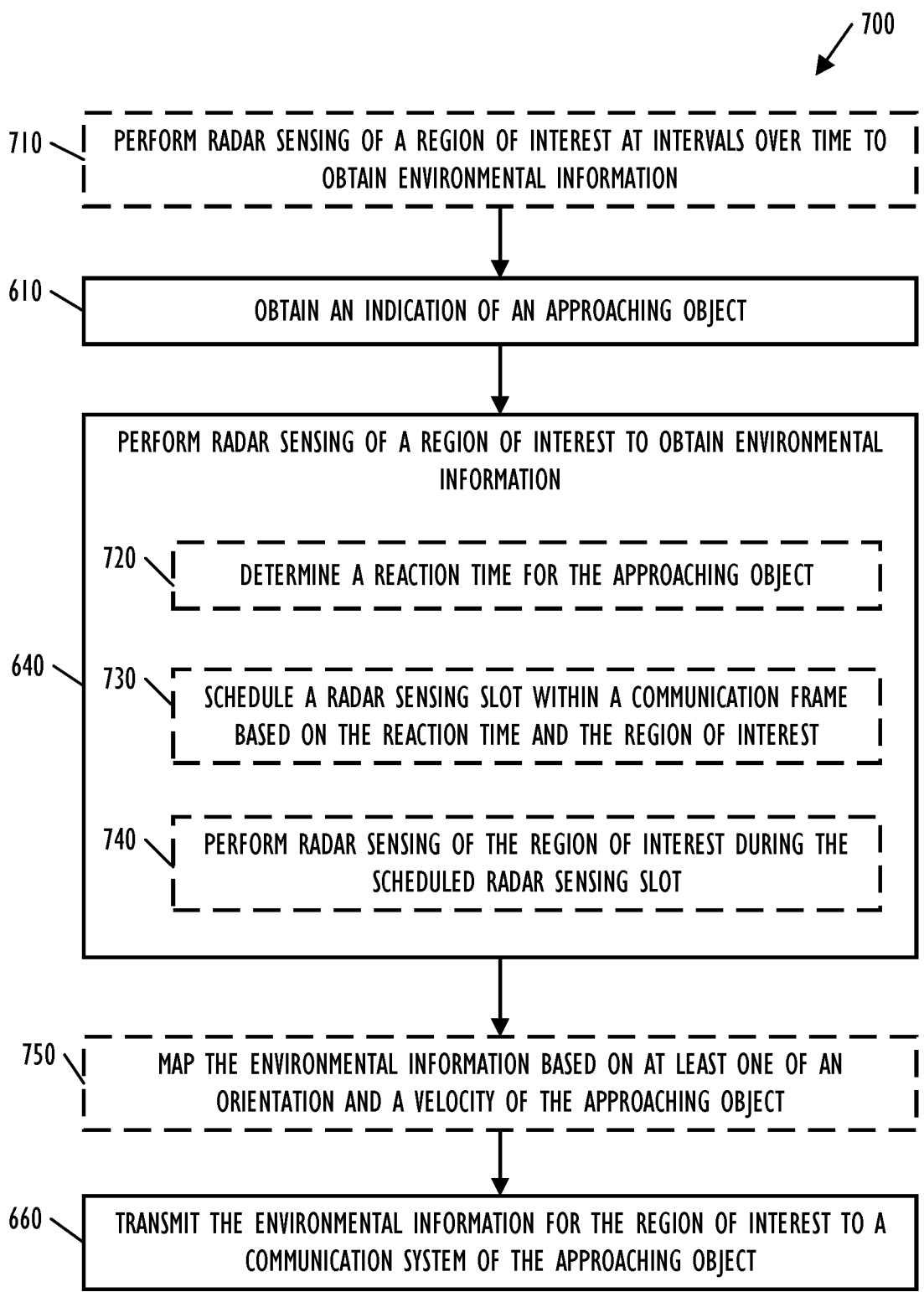
FIG. 7 shows, in flow chart form, another example process for infrastructure-assisted sensing and signaling, according to one embodiment.

FIG. 7 shows, in flow chart form, another example process 700 for infrastructure-assisted sensing and signaling, according to one embodiment. For ease of illustration, the process 700 is described herein with reference to the diagrams 200 and 400 shown in FIGS. 2 and 4, respectively, and the process 600 shown in FIG. 6. The process 700 can be performed by any appropriate processing unit executing instructions stored in any appropriate non-transitory computer-readable medium. The steps of process 700 are shown in a particular order in FIG. 7, but the steps of process 700 may be performed in a different order and/or with some steps performed simultaneously. One or more steps of process 700 can be optional, and process 700 can include additional steps.

The process 700 begins at step 710, at which a base station can optionally perform radar sensing of a region of interest at intervals over time to obtain environmental information. For example as described herein with respect to FIG. 4, the base station can perform radar sensing at regular intervals over time, such as once every minute, or during lulls in the communication demands of the base station. At step 610, the base station obtains an indication of an approaching object. The base station then performs radar sensing of a region of interest to obtain environmental information at step 640.

Performing radar sensing at step 640 can optionally include steps 720, 730, and 740. At step 720, the base station determines a reaction time for the approaching object, for example based on a velocity of the approaching object. At step 730, the base station schedules one or more radar sensing slots within one or more communication frames based on the reaction time determined at step 720 and characteristics of the region of interest, such as an expected speed of objects in the region of interest. For example, the base station can schedule the radar sensing slots such that the location, velocity, and angle of arrival of objects in the region of interest can be determined and provided to the approaching object within the appropriate reaction time. At step 740, the base station performs radar sensing of the region of interest during the one or more scheduled radar sensing slots.

At optional step 750, the base station can map the environmental information based on at least one of an orientation and velocity of the approaching object. For example, the base station can adapt the environmental information such that the approaching object can display a representation of the environmental information as a map. As another example, the base station can adapt the environmental information such that the location, velocity, and angle of arrival of objects in the region are given relative to the location and velocity of the approaching object. At step 660, the base station transmits the environmental information for the region of interest to a communication system of the approaching object.

FIG. 8 shows, in flow chart form, a further example process 800 for infrastructure-assisted sensing and signaling, according to one embodiment. For ease of illustration, the process 800 is described herein with reference to the diagrams 200 and 400 shown in FIGS. 2 and 4, respectively. The process 800 can be performed by any appropriate processing unit executing instructions stored in any appropriate non-transitory computer-readable medium. The steps of process 800 are shown in a particular order in FIG. 8, but the steps of process 800 may be performed in a different order and/or with some steps performed simultaneously. One or more steps of process 800 can be optional, and process 800 can include additional steps.

The process 800 begins at step 810, at which a base station obtains an indication of a first approaching object and an indication of a second approaching object. The base station can receive first and second information request from the first and second approaching objects, respectively, determine first and second location of the first and second approaching objects, or a combination thereof. The base station then performs radar sensing of a first region of interest for the first approaching object to obtain first environmental information and a second region of interest for the second approaching object to obtain second environmental information at step 820.

Performing radar sensing at step 820 can optionally include steps 830, 840, 860, and 870. At step 830, the base station determines a first reaction time for the first approaching object and a second reaction time for the second approaching object. At step 840, the base station determines a priority order based on the first and second reaction times. For example, the base station can prioritize radar sensing of the first region of interest for the first approaching object in response to the first reaction time being shorter than the second reaction time.

Determining the priority order at step 840 can optionally include steps 845, 850, and 855. At step 845, the base station determines whether the first and second regions of interest are substantially the same or have a threshold amount of overlap. For example as described herein with respect to FIG. 3, the threshold amount of overlap between the regions of interest can be determined based on the sizes of the regions of interest, radar sensing regions of the base station, the field of view of the radar sensing system in the base station, and the like. In response to the first and second regions of interest being substantially the same at step 845, the base station proceeds to step 850 and aggregates a radar sensing priority for the first and second regions of interest such that the first and second regions of interest are given a same priority. At step 855, the base station determines a transmission priority order for the first and second environmental information based on the first and second reaction times. For example, the base station can prioritize transmission of the environmental information for the region of interest corresponding to the approaching object with a shorter reaction time.

The base station proceeds to step 860 in response to the first and second regions of interest not being substantially the same at step 845 and from step 855, at which the base station schedules at least one radar sensing slot within at least one communication frame based on the priority order and characteristics of the first and second regions of interest, such as an expected speed of objects in the region of interest. For example, the base station can schedule the radar sensing slots such that the first region of interest is sensed first in response to the priority order indicating that the first region of interest has a higher priority than the second region of interest. At step 870, the base station performs radar sensing of the first and second regions of interest during the one or more scheduled radar sensing slots.

At step 880, the base station transmits the environmental information for the first region of interest to a communication system of the first approaching object and the environmental information for the second region of interest to a communication of the second approaching object based on the priority order. For example, the base station can transmit the environment information based on the transmission priority order determined at optional step 855.

As discussed previously herein, the disclosed techniques and methods enable base stations to operate in a reactive or proactive mode of operation to provide relevant environmental information to nearby objects in a timely manner. In a reactive sensing mode of operation, the base station obtains an indication of an approaching object by receiving an information request from the approaching object. The information request can include a region of interest for the approaching object, a reaction time for the approaching object, and the like. The base station performs radar sensing of the region of interest to obtain environmental information and transmits the environment information to a communication system of the approaching object, for example within the reaction time for the approaching object. In a proactive sensing mode of operation, the base station performs radar sensing of a known region of interest at intervals over time, such as once every minute. The base station obtains an indication of an approaching object by determining a location of the approaching object relative to the region of interest, and transmits the most current environmental information to a communication system of the approaching object.

Features specifically shown or described with respect to one embodiment set forth herein may be implemented in other embodiments set forth herein.

In this description, the term "couple" may cover connections, communications, or signal paths that enable a functional relationship consistent with this description, including intermediate or intervening components that do not alter the functional relationship. A device that is "configured to" perform a task or function may be configured by programming or hardwiring, for example, at a time of manufacturing by a manufacturer and/or may be configurable or reconfigurable by a user after manufacturing. The configuring may be done through firmware and/or software, construction and/or layout of hardware components and connections, or any combination thereof. As used herein, "node", "pin", and "lead" are used interchangeably. A circuit or device described herein as including certain components may be adapted to be coupled to those components instead, to form the described circuitry or device.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

A radar system includes at least one transmitter, at least one receiver, at least one processor, and at least one non-transitory computer-readable medium storing machine instructions. The machine instructions cause the at least one processor to obtain an indication of an approaching object, perform radar sensing of a region of interest to obtain environmental information, and transmit the environmental information for the region of interest to a communication system of the approaching object. In some implementations, the machine instructions to obtain the indication of the approaching object includes instructions to receive, from the communication system of the approaching object, a request for the environmental information for the region of interest. The request for environmental information for the region of interest can include at least one of an indicator of the region of interest and a reaction time for the approaching object in some embodiments.

In some implementations, the machine instructions to obtain the indication of the approaching object include instructions to determine a location of the approaching object relative to the region of interest, and the radar system is configured to transmit the environmental information in response to the location of the approaching object being within a threshold distance of the region of interest. The radar system can be further configured to perform radar sensing of the region of interest at intervals over time and in response to the location of the approaching object being within the threshold distance of the region of interest, transmit a current set of environmental information.

In some implementations, the environmental information for the region of interest includes at least one of a location of an identified object in the region of interest, a velocity of the identified object, and an angle of arrival for the identified object. The non-transitory computer-readable medium can further store machine instructions to cause the at least one processor to map the at least one of the location, velocity, and angle of arrival for the identified object based on at least one of an orientation and a velocity of the approaching object.

In some implementations, the machine instructions to perform radar sensing of the region of interest include machine instructions to determine a reaction time for the approaching object, schedule at least one sensing slot within at least one communication frame based on the determined reaction time and the region of interest, and perform the radar sensing of the region of interest during the at least one sensing slot within the at least one communication frame. In some implementations, the machine instructions to schedule the at least one sensing slot within the at least one communication frame include machine instructions to determine an expected speed for identified objects in the region of interest, determine a number of sensing slots and a number of communication frames such that an identified object moving at the expected speed can be detected, and schedule the number of sensing slots within the number of communication frames based on the determined reaction time, the region of interest, and the expected speed, such that the identified object moving at the expected speed can be detected.

In some implementations, the approaching object is a first approaching object and the region of interest is a first region of interest for the first approaching object. The non-transitory computer-readable medium further stores machine instructions to cause the at least one processor to obtain an indication of a second approaching object, determine a first reaction time for the first approaching object and a second reaction time for the second approaching object, determine a priority order based on the first and second reaction times, schedule at least one sensing slot within at least one communication frame based on the determined priority order and the first region of interest for the first approaching object and a second region of interest for the second approaching object, perform the radar sensing of the first and second regions of interest during the at least one sensing slot within the at least one communication frame, and transmit the environmental information for the first region of interest to a communication system of the first approaching object and environmental information for the second region of interest to a communication system of the second approaching object based on the determined priority order.

In some implementations, the machine instructions to determine the priority order based on the first and second reaction times include machine instructions to determine whether the first region of interest for the first approaching object and the second region of interest for the second approaching object are substantially the same and determine whether the first region of interest for the first approaching object and the second region of interest for the second approaching object are substantially the same. In response to the first and second regions of interest being substantially the same, the machine instructions cause the at least one processor to aggregate a radar sensing priority for the first and second regions of interest, and determine a transmission priority order based on the first and second reaction times. The environmental information for the first region of interest and the environmental information for the second region of interest can be transmitted based on the determined transmission priority order.

A method includes obtaining an indication of an approaching object, performing radar sensing of a region of interest to obtain environmental information, and transmitting the environmental information for the region of interest to a communication system of the approaching object. In some implementations, obtaining the indication of the approaching object includes receiving, from the communication system of the approaching object, a request for the environmental information for the region of interest. The request for the environmental information for the region of interest can include at least one of an indicator of the region of interest and a reaction time for the approaching object.

In some implementations, obtaining the indication of the approaching object includes determining a location of the approaching object relative to the region of interest, and transmitting the environmental information is performed in response to the location of the approaching object being within a threshold distance of the region of interest. In some embodiments, the method can further include performing radar sensing of the region of interest at intervals over time and in response to the location of the approaching object being within the threshold distance of the region of interest, transmitting a current set of environmental information. In some implementations, the environmental information for the region of interest includes at least one of a location of an identified object in the region of interest, a velocity of the identified object, and an angle of arrival for the identified object, and the method further includes mapping at least one of the location, velocity, and angle of arrival for the identified object based on at least one of an orientation and a velocity of the approaching object.

A non-transitory computer-readable medium stores machine instructions which, when executed by at least one processor, cause the at least one processor to obtain an indication of an approaching object, perform radar sensing of a region of interest to obtain environmental information, and transmit the environmental information for the region of interest to a communication system of the approaching object. In some implementations, the machine instructions to obtain the indication of the approaching object includes instructions to receive, from the communication system of the approaching object, a request for the environmental information for the region of interest. The request for environmental information for the region of interest can include at least one of an indicator of the region of interest and a reaction time for the approaching object in some embodiments.

In some implementations, the machine instructions to obtain the indication of the approaching object include instructions to determine a location of the approaching object relative to the region of interest, and the non-transitory computer-readable medium further stores machine instructions which, when executed by the at least one processor, cause the at least one processor to perform radar sensing of the region of interest at intervals over time and in response to the location of the approaching object being within a threshold distance of the region of interest, transmit a current set of environmental information. In some implementations, the environmental information for the region of interest includes at least one of a location of an identified object in the region of interest, a velocity of the identified object, and an angle of arrival for the identified object. The non-transitory computer-readable medium stores machine instructions which, when executed by the at least one processor, further cause the at least one processor to map at least one of the location, velocity, and angle of arrival for the identified object based on at least one of an orientation and a velocity of the approaching object

What is claimed is:

1. A radar system of a base station, the radar system comprising:
   at least one transmitter;
   at least one receiver;
   at least one processor; and
   at least one non-transitory computer-readable medium storing machine instructions which, when executed by the at least one processor, cause the at least one processor to:
      obtain an indication of an approaching object from a communication system of the approaching object, the indication including a request for environmental information for a region of interest;
      determine a reaction time for the approaching object;
      schedule at least one sensing slot within at least one communication frame based on the determined reaction time and the region of interest, wherein scheduling the at least one sensing slot comprises:
         determine an expected speed for one or more identified objects in the region of interest;
         determine a number of sensing slots and a number of communication frames such that an identified object of the one or more objects moving at the expected speed can be detected; and
         schedule the number of sensing slots within the number of communication frames based on the determined reaction time, the region of interest, and the expected speed;
      control the at least one receiver to perform radar sensing of the region of interest during the at least one sensing slot within the at least one communication frame to obtain the environmental information; and
      transmit the environmental information for the region of interest to the communication system of the approaching object.

2. The radar system of claim 1, wherein the request for the environmental information includes an identifier of an intersection within the region of interest.

3. The radar system of claim 1, wherein the request for the environmental information for the region of interest includes a reaction time for the approaching object.

4. The radar system of claim 1, wherein the machine instructions to obtain the indication of the approaching object include instructions to determine a location of the approaching object relative to the region of interest, and wherein the radar system is configured to transmit the environmental information in response to the location of the approaching object being within a threshold distance of the region of interest.

5. The radar system of claim 4, wherein the radar system is configured to:
   perform radar sensing of the region of interest at intervals over time to determine one or more sets of the environmental information; and
   in response to the location of the approaching object being within the threshold distance of the region of interest, transmit a current set of the one or more sets of the environmental information.

6. The radar system of claim 1, wherein the environmental information for the region of interest includes at least one of a location of an identified object in the region of interest, a velocity of the identified object, and an angle of arrival for the identified object.

7. The radar system of claim 6, wherein the non-transitory computer-readable medium stores machine instructions which, when executed by the at least one processor, further cause the at least one processor to map at least one of the location, velocity, and angle of arrival for the identified object based on at least one of an orientation and a velocity of the approaching object.

8. The radar system of claim 1, wherein the approaching object is a first approaching object and the region of interest is a first region of interest for the first approaching object, and wherein the non-transitory computer-readable medium stores machine instructions which, when executed by the at least one processor, further cause the at least one processor to:

obtain an indication of a second approaching object;

determine a first reaction time for the first approaching object and a second reaction time for the second approaching object;

determine a priority order based on the first and second reaction times;

schedule at least one sensing slot within at least one communication frame based on the determined priority order and the first region of interest for the first approaching object and a second region of interest for the second approaching object;

perform the radar sensing of the first and second regions of interest during the at least one sensing slot within the at least one communication frame; and transmit the environmental information for the first region of interest to a communication system of the first approaching object and environmental information for the second region of interest to a communication system of the second approaching object based on the determined priority order.

9. The radar system of claim 8, wherein the machine instructions to determine a priority order based on the first and second reaction times further comprise machine instructions to:

determine whether the first region of interest for the first approaching object and the second region of interest for the second approaching object are substantially the same;

in response to the first and second regions of interest being substantially the same:

aggregate a radar sensing priority for the first and second regions of interest; and determine a transmission priority order based on the first and second reaction times, wherein the environmental information for the first region of interest and the environmental information for the second region of interest are transmitted based on the determined transmission priority order.

10. A method comprising:

obtaining, at a processor of a radar system of a base station from a communication system of an approaching object, an indication of the approaching object, the indication including a request for environmental information for a region of interest, the indication of the approaching object;

determining, at the processor, a reaction time for the approaching object;

scheduling, by the processor, at least one sensing slot within at least one communication frame based on the determined reaction time and the region of interest, wherein scheduling the at least one sensing slot comprises:

determine an expected speed for one or more identified objects in the region of interest;

determine a number of sensing slots and a number of communication frames such that an identified object of the one or more objects moving at the expected speed can be detected; and schedule the number of sensing slots within the number of communication frames based on the determined reaction time, the region of interest, and the expected speed;

controlling, by the processor, at least one of a transmitter and a receiver to perform radar sensing of a region of interest during the at least one sensing slot within the at least one communication frame to obtain environmental information; and controlling, by the processor, the transmitter to transmit the environmental information for the region of interest to a communication system of the approaching object.

11. The method of claim 10, wherein the request for the environmental information for the region of interest includes at least one of an indicator of an intersection within the region of interest and a reaction time for the approaching object.

12. The method of claim 10, wherein obtaining the indication of the approaching object includes determining a location of the approaching object relative to the region of interest, wherein transmitting the environmental information is performed in response to the location of the approaching object being within a threshold distance of the region of interest.

13. The method of claim 12, further comprising:

performing radar sensing of the region of interest at intervals over time; and in response to the location of the approaching object being within the threshold distance of the region of interest, transmitting a current set of environmental information.

14. The method of claim 10, wherein the environmental information for the region of interest includes at least one of a location of an identified object in the region of interest, a velocity of the identified object, and an angle of arrival for the identified object, and wherein the method further comprises mapping at least one of the location, velocity, and angle of arrival for the identified object based on at least one of an orientation and a velocity of the approaching object.

15. A non-transitory computer-readable medium storing machine instructions which, when executed by at least one processor of a radar system of a base station, cause the at least one processor to:

obtain, by the at least one processor from a communication system of the approaching object, an indication of an approaching object including a request for environmental information for a region of interest;

determine a reaction time for the approaching object in response to the request;

schedule at least one sensing slot within at least one communication frame based on the determined reaction time and the region of interest, wherein scheduling the at least one sensing slot comprises:

determine an expected speed for one or more identified objects in the region of interest;

determine a number of sensing slots and a number of communication frames such that an identified object of the one or more objects moving at the expected speed can be detected; and schedule the number of sensing slots within the number of communication frames based on the determined reaction time, the region of interest, and the expected speed;

control at least one of a transmitter and a receiver to perform radar sensing of a region of interest to obtain environmental information; and transmit the environmental information for the region of interest to a communication system of the approaching object.

16. The non-transitory computer-readable medium of claim 15, wherein the machine instructions to obtain the indication of the approaching object include instructions to receive, from the communication system of the approaching object, a request for the environmental information for the region of interest, wherein the request for the environmental information for the region of interest includes at least one of an indicator of the region of interest and a reaction time for the approaching object.

17. The non-transitory computer-readable medium of claim 15, wherein the machine instructions to obtain the indication of the approaching object include instructions to determine a location of the approaching object relative to the region of interest, and wherein the non-transitory computer-readable medium stores machine instructions which, when executed by the at least one processor, further cause the at least one processor to:

perform radar sensing of the region of interest at intervals over time; and in response to the location of the approaching object being within a threshold distance of the region of interest, transmit a current set of environmental information.

18. The non-transitory computer-readable medium of claim 15, wherein the environmental information for the region of interest includes at least one of a location of an identified object in the region of interest, a velocity of the identified object, and an angle of arrival for the identified object, and wherein the non-transitory computer-readable medium stores machine instructions which, when executed by the at least one processor, further cause the at least one processor to map at least one of the location, velocity, and angle of arrival for the identified object based on at least one of an orientation and a velocity of the approaching object.

* * * * *